United States Patent
Kim et al.

(10) Patent No.: US 10,470,226 B2
(45) Date of Patent: Nov. 5, 2019

(54) METHOD AND APPARATUS FOR PERFORMING RADIO LINK MONITORING IN A WIRELESS COMMUNICATION SYSTEM

(71) Applicant: Samsung Electronics Co., Ltd., Suwon-si, Gyeonggi-do (KR)

(72) Inventors: Young-Bum Kim, Seoul (KR); Dong-Han Kim, Osan-si (KR); Han-Il Yu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/229,771

(22) Filed: Aug. 5, 2016

(65) Prior Publication Data

US 2017/0041112 A1 Feb. 9, 2017

(30) Foreign Application Priority Data

Aug. 7, 2015 (KR) .......................... 10-2015-0111613

(51) Int. Cl.
*H04W 24/08* (2009.01)
*H04W 76/14* (2018.01)
(Continued)

(52) U.S. Cl.
CPC ............. *H04W 76/14* (2018.02); *H04W 4/70* (2018.02); *H04L 5/0042* (2013.01)

(58) Field of Classification Search
CPC .... H04W 76/023; H04W 4/005; H04L 5/0042
See application file for complete search history.

(56) References Cited

U.S. PATENT DOCUMENTS

| 9,722,744 | B2* | 8/2017 | Siomina ................. H04L 5/0032 |
| 2011/0110251 | A1* | 5/2011 | Krishnamurthy ... H04W 72/082 370/252 |

(Continued)

FOREIGN PATENT DOCUMENTS

WO 2015-020378 A1 2/2015

*Primary Examiner* — Jay P Patel
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method for performing radio link monitoring (RLM) in a wireless communication system is provided. The method includes determining at least one subband for RLM by a UE restricted to use a subband corresponding to a part of a system transmission bandwidth, wherein the subband is a preconfigured part of the system transmission bandwidth, performing RLM in the determined at least one subband, and determining a radio link quality of the at least one subband based on the RLM.

20 Claims, 11 Drawing Sheets

(51) Int. Cl.
    *H04W 4/70*     (2018.01)
    *H04L 5/00*     (2006.01)

(56) References Cited

U.S. PATENT DOCUMENTS

| | | | |
|---|---|---|---|
| 2011/0188481 A1* | 8/2011 | Damnjanovic | H04W 72/04 370/336 |
| 2011/0269502 A1* | 11/2011 | Clark | H04B 1/006 455/552.1 |
| 2013/0064219 A1* | 3/2013 | Siomina | H04W 64/00 370/331 |
| 2013/0196675 A1* | 8/2013 | Xiao | H04W 72/082 455/452.1 |
| 2013/0201913 A1* | 8/2013 | Niemela | H04L 25/0226 370/328 |
| 2013/0223271 A1* | 8/2013 | Huang | H04W 72/02 370/252 |
| 2013/0308472 A1* | 11/2013 | Medles | H04L 25/0232 370/252 |
| 2013/0315122 A1 | 11/2013 | Sirotkin et al. | |
| 2013/0322363 A1 | 12/2013 | Chen et al. | |
| 2014/0010335 A1 | 1/2014 | Lee et al. | |
| 2014/0098761 A1 | 4/2014 | Lee et al. | |
| 2014/0153427 A1* | 6/2014 | Seo | H04L 1/20 370/252 |
| 2014/0357272 A1 | 12/2014 | Axmon et al. | |
| 2016/0183112 A1 | 6/2016 | Yang et al. | |
| 2016/0227602 A1* | 8/2016 | Yi | H04W 48/16 |
| 2016/0249364 A1* | 8/2016 | Siomina | H04W 28/048 |
| 2016/0295609 A1* | 10/2016 | Vajapeyam | H04L 5/14 |
| 2017/0208588 A1* | 7/2017 | Park | H04L 27/26 |
| 2017/0237535 A1* | 8/2017 | Park | H04L 5/0035 370/329 |
| 2017/0374570 A1* | 12/2017 | Yi | H04L 1/00 |
| 2018/0069612 A1* | 3/2018 | Yum | H04L 1/00 |

\* cited by examiner

METHOD AND APPARATUS FOR PERFORMING RADIO LINK MONITORING IN A WIRELESS COMMUNICATION SYSTEM

CROSS-REFERENCE TO RELATED APPLICATION(S)

This application claims the benefit under 35 U.S.C. § 119(a) of a Korean patent application filed on Aug. 7, 2015 in the Korean Intellectual Property Office and assigned Serial number 10-2015-0111613, the entire disclosure of which is hereby incorporated by reference.

TECHNICAL FIELD

The present disclosure relates to a wireless communication system. More particularly, the present disclosure relates to a radio link monitoring (RLM) method of a user equipment (UE) supporting only a part of subbands within a total system transmission bandwidth.

BACKGROUND

To meet the demand for wireless data traffic having increased since deployment of $4^{th}$-generation (4G) communication systems, efforts have been made to develop an improved 5th-generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

To achieve high data rates, deployment of the 5G communication system in a millimeter wave (mmWave) band (for example, a 60-GHz band) is under consideration. In order to mitigate propagation path loss and increase a propagation distance in the mmWave band, beamforming, massive MIMO, FD-MIMO, array antenna, analog beamforming, and large-scale antenna technology have been discussed for the 5G communication system.

Beyond voice-oriented service at their initial development stage, wireless communication systems are being developed to broadband wireless communication systems that provide high-speed, high-quality packet data services. For example, the broadband wireless communication systems may conform to communication standards such as 3rd generation project partnership (3GPP) high speed packet access (HSPA), evolved universal terrestrial radio access (E-UTRA), 3GPP2 high rate packet data (HRPD), ultra-mobile broadband (UMB), and institute of electrical and electronics engineers (IEEE) 802.16e.

A representative example of broadband wireless communication system, LTE adopts orthogonal frequency division multiplexing (OFDM) for downlink (DL) and single carrier frequency division multiple access (SC-FDMA) for uplink (UL), for broadband wireless communication. The multiple access schemes distinguish data or control information of users from one another by allocating and managing time-frequency resources for the users in such a manner that the time-frequency resources may not be overlapped for the respective users, that is, orthogonality may be maintained.

To increase transmission efficiency, the LTE system uses techniques including adaptive modulation and coding (AMC) and channel sensitive scheduling. A transmitter may control the amount of transmission data according to a channel state by using AMC. That is, if the channel state is poor, the transmitter may reduce the amount of transmission data, thereby adjusting a reception error probability to an intended level. On the contrary, if the channel state is good, the transmitter may increase the amount of transmission data, thereby effectively transmitting much information with an intended reception error probability. In channel sensitive scheduling, the transmitter services a user in a good channel state selectively from among a plurality of users. As a consequence, the wireless system capacity of the mobile communication system is increased, compared to a case in which the transmitter allocates a channel to a single user and services the user. The increase of the system capacity is called a multi-user diversity gain. In summary, AMC and channel sensitive scheduling are schemes of receiving a feedback partial channel state information (CSI) from a receiver and applying an appropriate modulation and coding scheme (MCS) at a time point determined to be most efficient.

If AMC is applied to an MIMO system, the number of spatial layers of a transmission signal or a rank, precoding, and the like may be considered. Specifically, when the MIMO system determines an optimum data rate using AMC, the number of layers for MIMO transmission as well as a coding rate and a modulation scheme may be considered.

To support AMC, a user equipment (UE) reports CSI to a base station (BS). The UE generates the CSI by measuring a reference signal (RS) received from the BS. The RS may include cell-specific RS (CRS) or channel status information-RS (CSI-RS). Time-frequency resources and a signal type to which the CRS and the CSI-RS are mapped are determined based on a pre-defined configuration.

The CSI includes at least one of a channel quality indicator (CQI), a precoding matrix indicator (PMI), or a rank indicator (RI). The CQI may represent a signal-to-interference and noise ratio (SINR) for a total system band (wideband) or a partial band (subband). In general, the CQI may be represented generally as a MCS for satisfying a predetermined data reception performance. The PMI may provide information about a precoding scheme required for data transmission through multiple antennas from a BS. The RI may provide information about a rank required for data transmission through multiple antennas from a BS. That is, the CSI is information that a UE provides to a BS to help the BS with scheduling decision. The BS may actually determine an MCS, a precoding scheme, and a rank to be applied to data transmission, based on the CSI.

Further, the LTE system adopts hybrid automatic repeat request (HARQ) in which if decoding of initial transmission data is failed, a physical layer retransmits the data. That is, the HARQ is a scheme in which if a receiver (for example, a UE) fails to accurately decode data, the receiver transmits a negative acknowledgment (NACK) indicating the decoding failure to a transmitter (for example, a BS) and thus the transmitter retransmits the data at the physical layer. As the receiver combines the retransmission data from the transmitter with the decoding-failed data, thereby increasing data reception performance. On the other hand, if the receiver accurately decodes the data, the receiver may transmit an acknowledgement (ACK) indicating the decoding success to the transmitter so that the transmitter may transmit new data.

Control information such as an HARQ ACK/NACK and CSI that the UE feeds back to the BS is called UL control information (UCI). In the LTE system, UCI is transmitted to the BS on a UL control channel dedicated to control information, physical uplink control channel (PUCCH), or multiplexed with data that the UE intends to transmit and transmitted to the BS on a physical channel for UL data transmission, physical uplink shared channel (PUSCH).

FIG. 1 illustrates a basic configuration of a time-frequency area being a wireless resource area, to which a DL data channel or control channel may be allocated in the LTE system according to the related art.

Referring to FIG. 1, the horizontal axis represents time, and the vertical axis represents frequency. In the time domain, a minimum transmission unit is an OFDM symbol. One slot 106 includes $N_{symb}$ OFDM symbols 102, and one subframe 105 includes two slots. One slot is 0.5 ms long, and one subframe is 1.0 ms long. A radio frame 114 is a time-domain unit including 10 subframes. A frequency-domain minimum transmission unit is a subcarrier, and a total system transmission bandwidth includes $N_{BW}$ subcarriers 104.

A basic time-frequency resource unit is a resource element (RE) 112, represented by an OFDM symbol index and a subcarrier index. A resource block (RB) or physical RB (PRB) 108 is defined by $N_{symb}$ contiguous OFDM symbols 102 in the time domain and $N_{RB}$ contiguous subcarriers 110 in the frequency domain. Therefore, one RB 108 includes $N_{symb} \times N_{RB}$ REs 112. In general, a minimum data transmission unit is an RB. In the LTE system, it is typical that $N_{symb}=7$, and $N_{RB}=12$, and $N_{BW}$ and $N_{RB}$ are proportional to a system transmission bandwidth. A data rate increases in proportion of the number of RBs scheduled for a UE. Six transmission bandwidths (refer to Table 1) are defined and managed in the LTE system. In a frequency division duplex (FDD) system in which DL and UL are distinguished from each other by frequency, a DL transmission bandwidth and a UL transmission bandwidth may be different. A channel bandwidth is a radio frequency (RF) bandwidth corresponding to a system transmission bandwidth. Table 1 illustrates a mapping relationship between system transmission bandwidths defined in the LTE system and channel bandwidths. For example, for an LTE system with a channel bandwidth of 10 MHz, the transmission bandwidth includes 50 RBs.

TABLE 1

| | Channel Bandwidth $BW_{Channel}$ [MHz] | | | | | |
|---|---|---|---|---|---|---|
| | 1.4 | 3 | 5 | 10 | 15 | 20 |
| Transmission Bandwidth Configuration $N_{RB}$ [Number of RBs] | 6 | 15 | 25 | 50 | 75 | 100 |

Downlink control information (DCI) is transmitted in the first N OFDM symbols of a subframe. In general, N={1, 2, 3}. Therefore, N varies in each subframe according to the amount of control information to be transmitted in the current subframe. The control information may include a control channel transmission period indicator indicating the number of OFDM symbols over which the control information is transmitted, scheduling information for DL data or UL data, an HARQ ACK/NACK information, and so on.

In the LTE system, an evolved Node B (eNB) transmits to a UE scheduling information for DL data or UL data in DCI. Herein, UL refers to a radio link through which a UE transmits data or a control signal to an eNB, whereas DL refers to a radio link through which an eNB transmits data or a control signal to a UE. DCI is defined in various formats, and may indicate whether control information is scheduling information for UL data (a UL grant) or scheduling information for DL data (a DL grant), whether the DCI is compact DCI with a small size of control information, whether spatial multiplexing using multiple antennas is used, or whether the DCI is for power control, according to a predetermined DCI format. For example, Table 2 illustrates control information in DCI format 1, which is a DL grant.

TABLE 2

| Control information | Description |
|---|---|
| Resource allocation type flag | Resource allocation scheme. A basic scheduling unit is an RB defined by time and frequency resources, and a resource block group (RBG) includes a plurality of RBs.<br>0: allocates resources on an RBG basis by applying a bitmap.<br>1: allocates a specific RB within an RBG |

TABLE 2-continued

| Control information | Description |
| --- | --- |
| Resource block assignment | RB allocated for data transmission Represented resources are determined according to system bandwidth and the resource allocation scheme |
| MCS | Modulation scheme used for data transmission and the size of a transport block being intended transmission data |
| HARQ process number | Number of HARQ process |
| New data indicator | Indicates initial transmission or retransmission |
| Redundancy version | Redundancy version of HARQ |
| Transmit power control (TPC) command for PUCCH | TPC command for a UL control channel, PUCCH |

The DCI is transmitted on a physical downlink control channel (PDCCH) or an enhanced PDCCH (EPDCCH) after channel coding and modulation.

In general, the DCI is channel-encoded independently for each UE and transmitted on an independent PDCCH to the UE. The DCI is mapped to a control channel transmission period in the time domain. The position of a frequency area to which the DCI is mapped is determined according to the identification (ID) of the UE, and the frequency area is distributed across a total system transmission band.

DL data is transmitted on a physical channel for DL data transmission, physical downlink shared channel (PDSCH). The PDSCH is mapped after the control channel transmission period in the time domain. Scheduling information such as information about the position of a frequency area to which the PDSCH is mapped, and a modulation scheme for the PDSCH is included in DCI transmitted on the PDCCH.

The eNB indicates the modulation scheme applied to the PDSCH and the size of data to be transmitted (a transport block size (TB S)) to the UE by an MCS (5 bits) included in the DCI. The TBS is the size of a TB before channel coding is applied on the TB, for error correction.

The LTE system supports quadrature phase shift keying (QPSK), 16-ary QAM (16 QAM), 64 QAM, and 256 QAM as modulation schemes. These modulation schemes have modulation orders $Q_m$ of 2, 4, 6, and 8, respectively. That is, 2 bits per symbol may be transmitted in QPSK, 4 bits per symbol may be transmitted in 16 QAM, 6 bits per symbol may be transmitted in 64 QAM, and 8 bits per symbol may be transmitted in 256 QAM.

If the radio link quality between a transmitter and a receiver becomes poor to or below a predetermined level in a wireless communication system, data transmission and reception may not be performed normally. Therefore, a UE or an eNB determines whether a radio link failure (RLF) has occurred by monitoring a radio link quality (this operation is referred to as radio link monitoring (RLM)), and performs an operation corresponding to the determination.

FIG. 2 illustrates a procedure for determining whether an RLF has occurred by a UE in the LTE system according to the related art.

The UE accesses an eNB and transmits and receives data to and from the eNB during an active period 208. If the radio link quality between the UE and the eNB becomes poor continuously during a predetermined listening interval (listening period) 210, the UE recognizes that a problem has occurred to a radio link at time 201. If the radio link quality is not recovered during a predetermined time period T1 212, the UE may determine that an RLF has occurred at time 202. Upon occurrence of the RLF, the UE attempts to access a cell (i.e. a BS) having the best radio link quality from among neighbor cells during a predetermined time period T2 214. Once the UE accesses the cell having the best radio link quality, the UE continues data transmission and reception with the cell. On the contrary, if the UE fails to access the cell, the UE may end all transmission and reception operations and transition to an idle state 216.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide various radio link monitoring (RLM) methods of a user equipment (UE) supporting a smaller bandwidth than a channel bandwidth of a system.

In accordance with an aspect of the present disclosure, a method for performing RLM in a wireless communication system is provided. The method includes determining at least one subband for RLM by a UE restricted to use a subband corresponding to a part of a system transmission bandwidth, wherein the subband is a preconfigured part of the system transmission bandwidth, performing RLM in the determined at least one subband, and determining a radio link quality of the determined at least one subband based on the RLM.

In accordance with another aspect of the present disclosure, a UE for performing RLM in a subband corresponding to a part of a system transmission bandwidth in a wireless communication system is provided. The UE includes a controller configured to determine at least one subband in the system transmission bandwidth for RLM, perform RLM in the determined at least one subband, and determine a radio link quality of the at least one subband based on the RLM.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
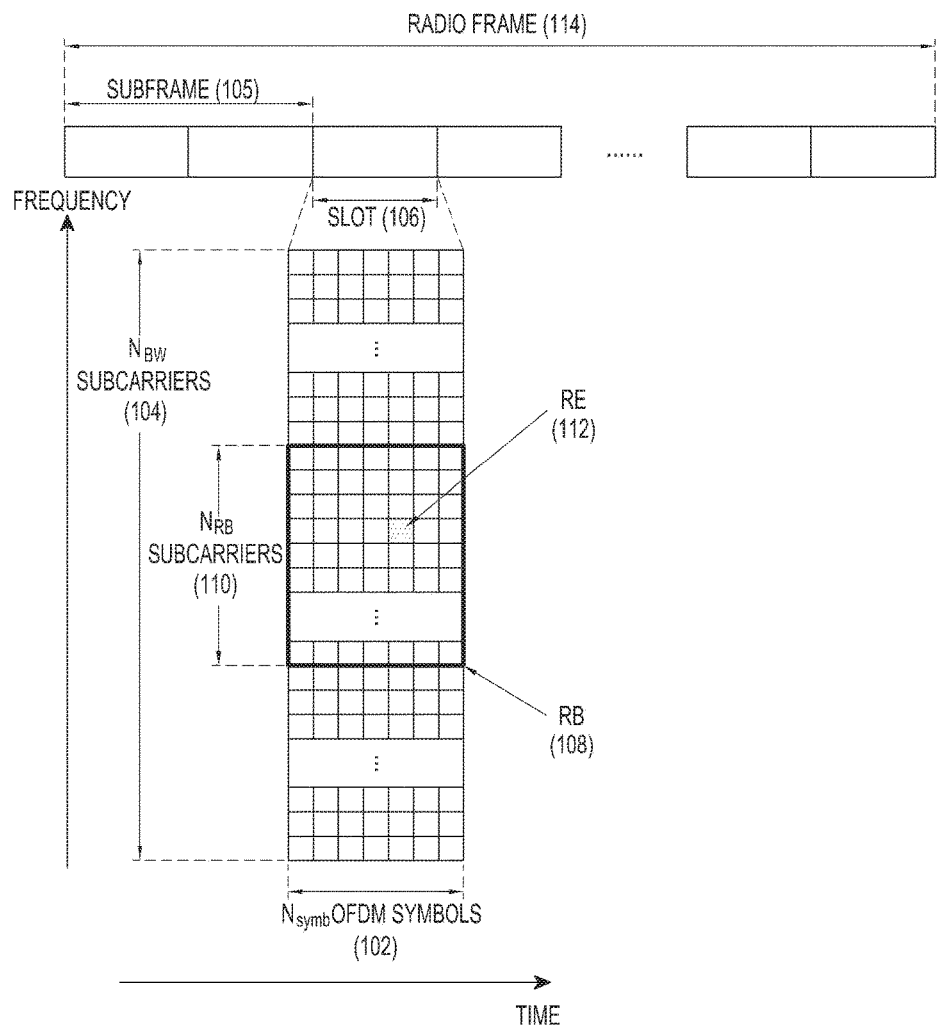
FIG. 1 illustrates a basic configuration of a time-frequency area being a wireless resource area, to which a downlink (DL) data channel or control channel may be allocated in a long term evolution (LTE) system according to the related art.
Figure 2:
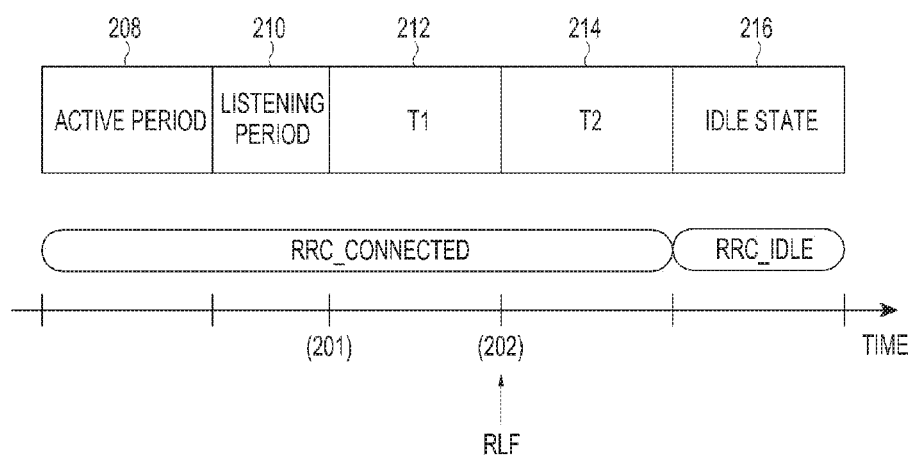
FIG. 2 illustrates a procedure for determining whether a radio link failure (RLF) has occurred by a user equipment (UE) in the LTE system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

Terms used herein are defined in consideration of functions according to the present disclosure and may be changed according to the intention of a user or an operator, or customs. Therefore, the definition should be made based on the comprehensive contents of the present disclosure. A base station (BS) is an entity that allocates resources to a user equipment (UE). The BS may be at least one of a Node B, an evolved Node B (eNode B or eNB), a wireless access unit, a BS controller (BSC), or a network node. The UE may be any of a mobile station (MS), a cellular phone, a smartphone, a computer, or a multimedia system having communication functionality. In the present disclosure, downlink (DL) refers to a wireless transmission path of a signal transmitted to a UE by a BS, and uplink (UL) refers to a wireless transmission path of a signal transmitted to a BS by a UE. While the various embodiments of the present disclosure are described in the context of a long term evolution (LTE) or LTE-advanced (LTE-A) system, by way of example, they are also applicable to other communication systems having a similar technical background or channel configuration. Also, it is readily understood to those skilled in the art that the various embodiments of the present disclosure are applicable to other communication systems through some modifications without departing from the scope of the present disclosure.

The afore-described LTE system may support a low-cost, low-complexity UE for which a part of their functions are restricted. It is expected that the function-restricted UE is suitable for machine type communication (MTC) or machine-to-machine (M2M) communication, which is intended mainly for remote metering, security, logistics, and so on. It is also expected that the function-limited UE will be used to realize a cellular Internet of things (IoT).

To achieve low cost and low complexity, the number of reception antennas may be limited to 1 for the UE, thereby reducing the cost of radio frequency (RF) devices. Or the cost of data reception buffers at the UE may be reduced by defining an upper limit on a transport block size (TBS) that the UE can process. In other words, while a legacy LTE UE has a function of transmitting and receiving a wideband signal in a band of at least 20 MHz irrespective of a system transmission bandwidth, a low-cost, low-complexity UE may be configured by limiting a maximum bandwidth to below 20 MHz in the present disclosure. For example, an operation of a UE supporting only a channel bandwidth of 1.4 MHz may be defined in an LTE system having a channel bandwidth of 20 MHz. In this case, since the UE supports only a specific subband within a total channel bandwidth, there is a need for defining a transmission and reception operation for the UE, different from that of a legacy LTE UE.

The present disclosure provides a radio link monitoring (RLM) method and apparatus of a UE for which functions are limited in a wireless communication system, as described above. Particularly, the present disclosure provides a specific RLM operation of the UE in the case where a maximum bandwidth that the UE is capable of processing is smaller than a total channel bandwidth or transmission bandwidth. Therefore, the UE may perform RLM more efficiently.

Before a description of the RLM operation of the UE, it may be determined whether a radio link failure (RLF) has occurred as follows, for example. The UE may determine whether an RLF has occurred by measuring the signal strength of a reference signal (RS) received from an eNB during a predetermined time and comparing the measured signal strength with a predefined threshold $Q_{out}$. Specifically, if the measured signal strength is larger than the threshold $Q_{out}$, the radio link quality is determined to be good and thus the UE may determine radio link success, and otherwise, the UE may determine RLF. The threshold $Q_{out}$ may be a received signal strength of an RS corresponding to a block error rate (BLER) of a physical channel for transmission of control information, physical downlink control channel (PDCCH). That is, with prior knowledge of the relationship between received signal strengths of an RS and BLERs of a PDCCH, the UE may estimate a BLER of the PDCCH from the strength of an RS received at any time point irrespective of actual transmission of the PDCCH. The PDCCH may be replaced with another physical channel, for example, a DL channel for supporting the UE, MTC-PDCCH (M-PDCCH).

An example of the RS is a cell-specific RS (CRS), and the UE may determine a radio link quality by measuring the signal strength of a received CRS. CRSs are distributed across a total system transmission bandwidth. However, since the UE provided by the present disclosure supports a part of the system transmission bandwidth, it is necessary to determine a frequency band in which the UE is to receive CRSs and measure a radio link quality from the CRSs. Herein below, a UE supporting a part of a system transmission bandwidth will be referred to as a 'narrow-band UE', for the convenience of description. Also, a subband that the narrow-band UE monitors to determine whether an RLF has occurred will be referred to as 'narrow subband'. The bandwidth of the narrow subband may not exceed the system transmission bandwidth. For example, the narrow subband may be a minimum transmission bandwidth 1.4 MHz (6 resource blocks (RBs)) supported by the LTE system. When needed, the narrow subband may have various transmission bandwidths such as 180 kHz (1 RB). The frequency position of the narrow subband in the system transmission bandwidth may be fixed or variable over time.

Compared to a legacy LTE UE supporting a total system transmission bandwidth, a narrow-band UE according to the present disclosure is limited to a narrow subband as an instantaneously processable bandwidth, and thus may not measure a radio link quality from CRSs transmitted across the total system transmission bandwidth.

Now, a description will be given of various embodiments in which a narrow-band UE monitors a narrow subband within a system transmission bandwidth in order to measure a radio link quality.

<Embodiment 1>

According to an embodiment, a narrow-band UE determines a predetermined subband within a system transmission bandwidth to be a narrow subband in order to measure a radio link quality, and monitor the predetermined subband.

Figure 3:
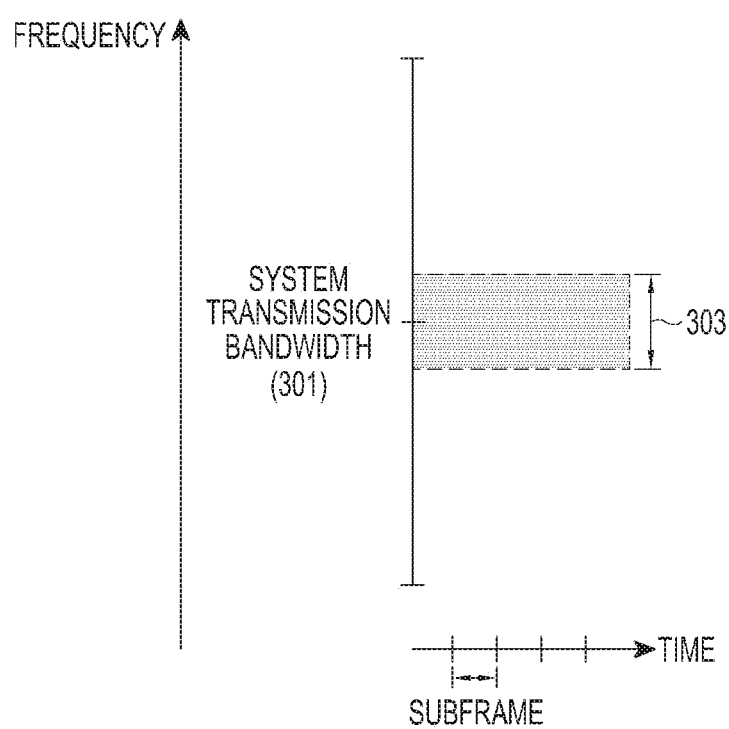
FIG. 3 illustrates a narrow subband of a predetermined band, monitored by a narrow-band UE according an embodiment of the present disclosure.

FIG. 3 illustrates a narrow subband of a predetermined band, which a narrow-band UE monitors according an embodiment of the present disclosure. For example, the narrow subband may be positioned at the center of a system transmission bandwidth. Such a narrow subband is illustrated in FIG. 3.

Referring to FIG. 3, in a wireless communication system, a system transmission bandwidth 301 is constant irrespective of passage of time. A UE monitoring the total system transmission bandwidth 301 (e.g., an LTE UE) may receive RSs transmitted across the total system transmission bandwidth 301 in order to measure a radio link quality. On the other hand, the narrow-band UE may not receive RSs transmitted across the total system transmission bandwidth 301 at the same time. For example, the narrow-band UE may be a low-cost UE configured to reduce fabrication cost. A bandwidth that the narrow-band UE may measure does not exceed a maximum bandwidth that the narrow-band UE is capable of processing.

The narrow-band UE not capable of receiving RSs transmitted across the total system transmission bandwidth 301 may pre-configure a part of the system transmission bandwidth 301 as a narrow subband 303. The narrow-band UE may monitor an RS transmitted in the narrow subband 303 in order to measure a radio link quality.

The narrow-band UE may configure the narrow subband 303 on its own, or the eNB may configure the narrow subband 303 and signal the configured narrow subband 303 to the narrow-band UE. A different narrow subband 303 may be configured according to the type of a narrow-band UE, the surroundings of the narrow-band UE, a communication system, and so on. For example, a synchronization signal for UL time synchronization of the UE to a predefined eNB transmission timing, and a physical broadcast channel (PBCH) carrying control information required for system access of the UE may be transmitted in six center RBs of the system transmission bandwidth in the LTE communication system. The UE basically needs to perform a reception operation in the frequency area at a time point when the synchronization signal and the PBCH are transmitted. Accordingly, the narrow-band UE may fix the narrow subband 303 to the 6 RBs. The narrow-band UE for which the narrow subband 303 is fixed to the 6 RBs may minimize a reception frequency switching operation. Also, the narrow subband 303 may be 1 RB (180 kHz) when needed, instead of the 6 RBs.

In a modification example of the foregoing embodiment as described below, a narrow-band UE monitors a plurality of predetermined narrow subbands within a system transmission bandwidth in a predetermined order. That is, the narrow-band UE searches for a subband 303 having a good radio link quality by monitoring each of the plurality of narrow subbands for a predetermined time. The RLM method of the narrow-band UE may be defined as a cycling scheme. The modification example of the first embodiment may make up for a shortcoming of the first embodiment. Specifically, a narrow subband 303 monitored by the narrow-band UE has a relatively narrow bandwidth. The narrow-band UE transmits and receives data or a control signal in a single subband 303 at any time instant. If all narrow-band UEs monitor the same narrow subband 303, the number of narrow-band UEs supported by the eNB is limited, compared to the number of narrow-band UEs supported by use of the total system transmission bandwidth, and a radio link quality is also decreased. Accordingly, if the eNB is to support a large number of narrow-band UEs, the eNB may configure and manage a plurality of narrow subbands to thereby simultaneously service the narrow-band UEs.

Figure 4:
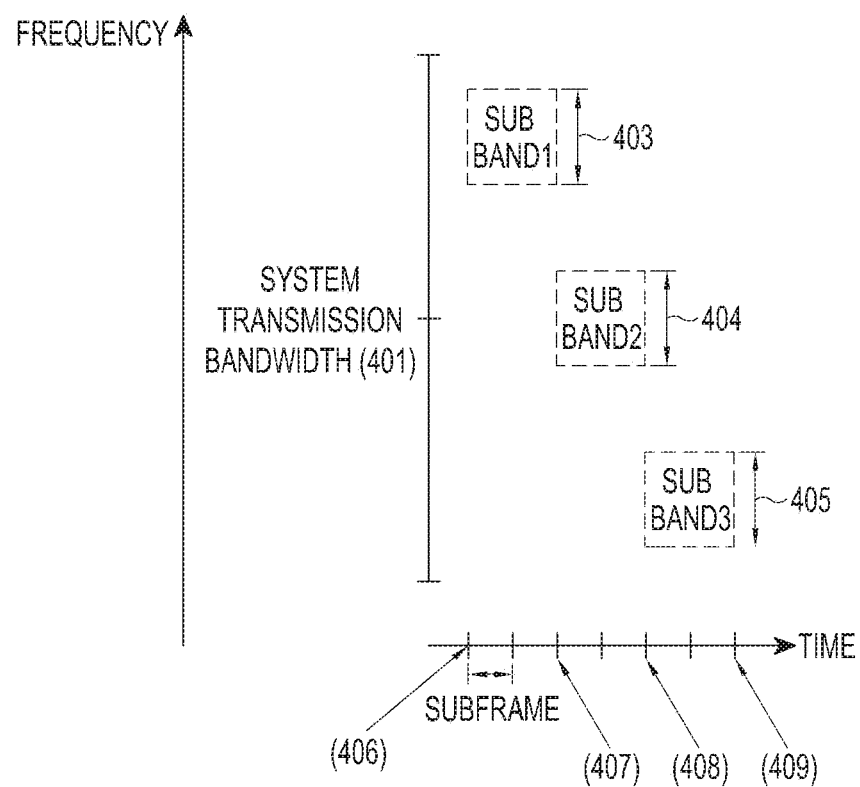
FIG. 4 illustrates a plurality of narrow subbands monitored in a predetermined order by a narrow-band UE according to a modification example of the embodiment of the present disclosure.

FIG. 4 illustrates a plurality of narrow subbands that a narrow-band UE monitors in a predetermined order according to an embodiment of the present disclosure.

Referring to FIG. 4, the narrow-band UE performs RLM in a first narrow subband (narrow subband 1) 403 during time 406 to time 407, a second narrow subband (narrow subband 2) 404 during time 407 to time 408, and a third narrow subband (narrow subband 3) 405 during time 408 to time 409. The narrow subbands 403, 404, and 405 may be each a pre-configured part of the system transmission bandwidth 401.

The eNB may preliminarily indicate the frequency positions of the plurality of narrow subbands, and information about a time point at which the narrow-band UE is to measure each of the narrow subbands to the narrow-band UE by signaling. Or the narrow-band UE may autonomously determine when to measure a radio link quality in which of the plurality of narrow subbands configured by the eNB. Preferably, the narrow-band UE may alternately measure narrow subbands to be measured during each measurement interval so as to minimize time taken to measure a radio link quality for all of the configured narrow subbands.

On the other hand, the narrow-band UE may always perform RLM only in one fixed narrow subband irrespective of the number of narrow subbands configured for the narrow-band UE in the first embodiment.

Figure 5:
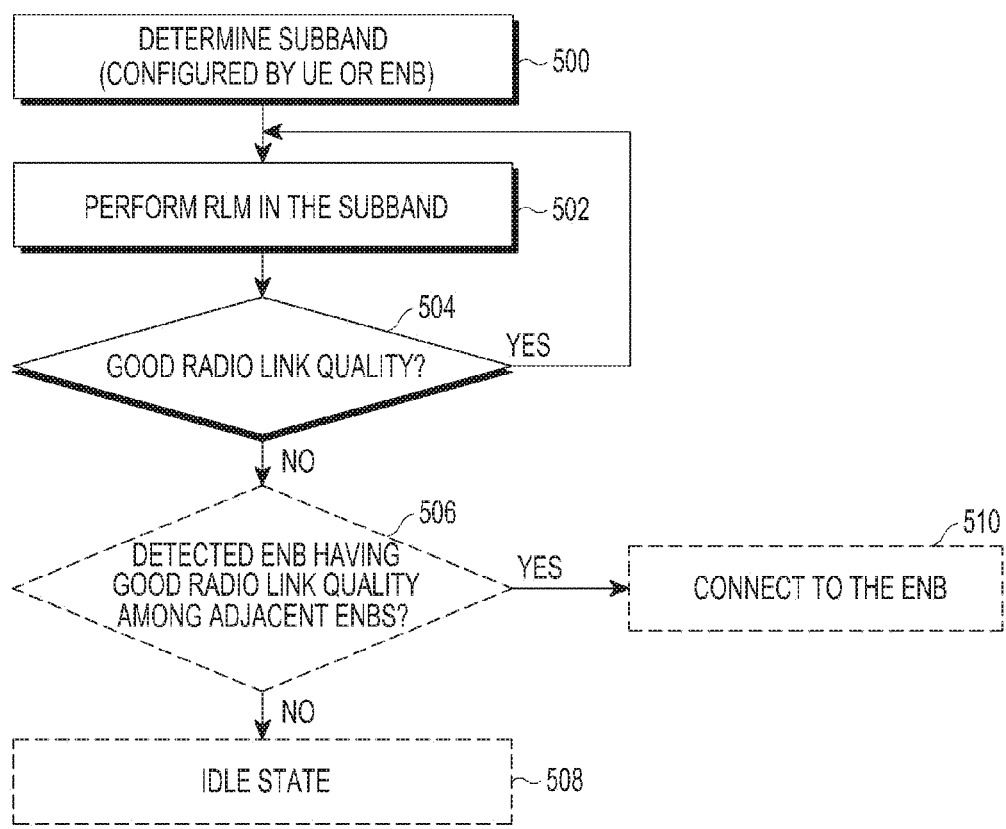
FIG. 5 is a flowchart illustrating a radio link monitoring (RLM) procedure of a narrow-band UE according to the embodiment of the present disclosure.

FIG. 5 is a flowchart illustrating an RLM procedure of a narrow-band UE according to the first embodiment of the present disclosure.

In operation 500, the narrow-band UE may acquire, from the eNB, narrow subband information for use in measuring a radio link quality, and determine narrow subbands based on the acquired information. The narrow subband information may include information about the positions and number of the narrow subbands and information indicating a narrow subband in which the narrow-band UE is to measure a radio link quality. The narrow subband information may be included in a master information block (MIB), a system information block (SIB) for the narrow-band UE, or radio resource control (RRC) signaling for the narrow-band UE. However, the narrow-band UE may autonomously configure a narrow subband without acquiring the narrow subband information from the BS, under some circumstances.

In operation 502, the narrow-band UE performs RLM in the narrow subband determined in operation 500. Selectively, according to a modification example of the first embodiment, the narrow subband information acquired from the BS may indicate a plurality of narrow subbands. In the case of a plurality of narrow subbands, the narrow-band UE may sequentially monitor the narrow subbands. The subsequent operations may be performed optionally by the narrow-band UE.

In operation 504, the narrow-band UE determines the radio link quality of the monitored narrow subband. If the radio link quality of the narrow subband is good, the narrow-band UE continues monitoring the narrow subband in operation 502. On the contrary, if determining that the radio link quality of the narrow subband is kept poor, the narrow-band UE searches for an eNB having a good radio link quality among adjacent eNBs in operation 506. If the narrow-band UE detects an eNB having a good radio link quality, the narrow-band UE attempts to connect to the BS with a good radio link quality in operation 510.

However, if the narrow-band UE fails to detect an eNB having a good radio link quality, the narrow-band UE may transition to an idle state in operation 508.

<Embodiment 2>

In another embodiment, a narrow-band UE dynamically monitors a narrow subband within a system transmission bandwidth to measure a radio link quality. In other words, compared to the foregoing embodiment, the second embodiment is characterized in that a narrow subband that the narrow-band UE monitors to measure a radio link quality is linked to a frequency band scheduled by an eNB. However, the size of the narrow subband may not exceed a maximum bandwidth that the narrow-band UE is capable of processing, as in the foregoing embodiment.

Figure 6:
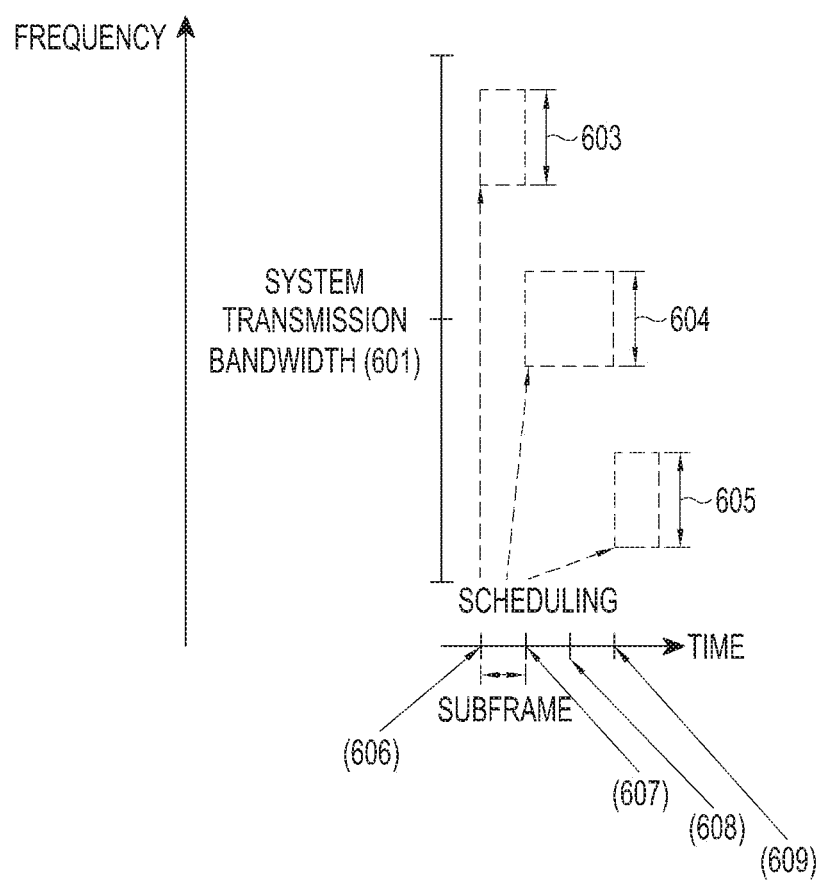
FIG. 6 illustrates narrow subbands to be monitored by a narrow-band UE according to another embodiment of the present disclosure.

FIG. 6 illustrates narrow subbands that a narrow-band UE monitors according to another embodiment of the present disclosure. The narrow subbands are scheduled by the eNB. Like the modification example of the first embodiment, the second embodiment is also based on the assumption that the eNB configures and manages a plurality of narrow subbands to support the narrow-subband UE. Also, the narrow-subband UE transmits and receives data or a control signal in one narrow subband at any time instant.

Referring to FIG. 6, the eNB schedules a first narrow subband (narrow subband 1) 603 for the narrow-subband UE at time 606. The narrow-subband UE recognizes narrow subband 1 603 as a subband for radio link quality measurement. Until before the eNB changes the subband for radio link quality measurement by scheduling, the narrow-subband UE monitors narrow subband 1 603.

The eNB schedules a second narrow subband (narrow subband 2) 604 for the narrow-subband UE to monitor at time 607. Then, the narrow-subband UE monitors narrow subband 2 604, determining narrow subband 2 604 to be a subband for radio link quality measurement.

On the other hand, since the eNB does not schedule a subband for radio link quality measurement for the narrow-subband UE at time 608, the narrow-subband UE still monitors narrow subband 2 604. That is, since eNB scheduling takes place at time 609 after time 607, the narrow-subband UE determines narrow subband 2 604 to be the subband for radio link quality measurement from time 607 to time 609. In other words, even though there is no scheduling for the narrow-subband UE at time 608, the narrow-subband UE keeps narrow subband 2 604 as an RLM subband.

The eNB schedules a third narrow subband (narrow subband 3) 605 for the narrow-subband UE at time 609. The narrow-subband UE monitors narrow subband 3 605, determining narrow subband 3 605 to be a subband for radio link quality measurement until eNB scheduling additionally takes place.

The narrow subbands 603, 604, and 605 may be each a pre-configured part of the system transmission bandwidth 601.

In a modification example of the second embodiment, the bandwidth A of a subband scheduled by the eNB may be narrower than the bandwidth B of a narrow subband of the narrow-subband UE, for radio link quality measurement (A<B). In this case, the eNB configures at least one subband for radio link quality measurement for the narrow-subband UE and schedules the subband for the narrow-subband UE. After the narrow-subband UE determines a narrow subband to which the subband scheduled by the eNB belongs from among narrow subbands available to the narrow-subband UE, and then monitors the whole narrow subband. For example, if the bandwidth A of a subband scheduled for the narrow-subband UE by the eNB is 180 KHz (that is, 1 RB) and the bandwidth B of a narrow subband in which the narrow-subband UE measures a radio link quality is 1.4 MHz (that is, 6 RBs), the narrow-subband UE may monitor the bandwidth B of the narrow subband, instead of the bandwidth A of the scheduled subband. Since the bandwidth of a narrow subband to be monitored is fixed to a maximum bandwidth that the narrow-subband UE is capable of processing irrespective of whether the bandwidth of an actually scheduled subband is relatively narrow or changed at each scheduling time, the accuracy of radio link quality measurement of the narrow-subband UE may be increased.

In another modification example of the second embodiment as described later, the narrow-subband UE dynamically changes a narrow subband for RLM according to eNB scheduling, as in the second embodiment. However, in the absence of additional eNB scheduling for a predetermined time, the narrow-subband UE may switch the narrow subband for RLM to a predetermined narrow subband.

Figure 7:
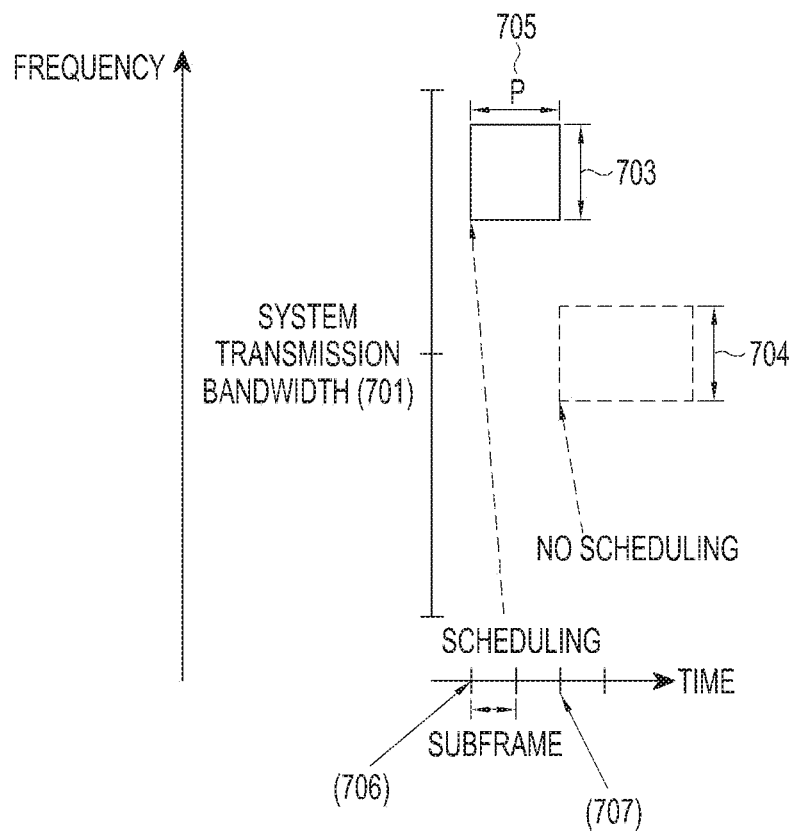
FIG. 7 illustrates a narrow subband that a narrow-band UE monitors to measure a radio link quality according to an embodiment of the present disclosure.

FIG. 7 illustrates a narrow subband that a narrow-band UE monitors to measure a radio link quality according to an embodiment of the present disclosure.

Referring to FIG. 7, the eNB schedules a first narrow subband (narrow subband 1) 703 for the narrow-band UE at time 706. Then, the narrow-band UE may perform RLM in narrow subband 1 703 until before the eNB changes the RLM subband. However, if a narrow subband for RLM is not additionally scheduled for the narrow-band UE during a predetermined time period P 705 after time 706, the narrow-band UE may determine a predetermined second narrow subband (narrow subband 2) 704 to be a subband for radio link quality measurement from time 707 after elapse of the time period P 705, and perform RLM in narrow subband 2

704. It is assumed that if the eNB does not schedule a subband for radio link quality measurement for the narrow-band UE during a predetermined time, narrow subband 2 704 is a predetermined subband to be monitored for radio link quality measurement. Subsequently, if the eNB schedules an RLM subband for the narrow-band UE, the narrow-band UE may determine the scheduled subband to be a narrow subband for radio link equality measurement.

The eNB may indicate the time period P and the subband to the narrow-band UE by signaling. Or the narrow-band UE may autonomously define and manage the time period P. The narrow subbands 703 and 704 may be each a pre-configured part of the system transmission bandwidth 701.

Another modification example of the second embodiment will be described below. If the eNB does not configure a narrow subband for RLM for the narrow-band UE for a predetermined time, the narrow-band UE may adjust the size of the narrow subband within the maximum bandwidth which the narrow-band UE is capable of processing.

Figure 8:
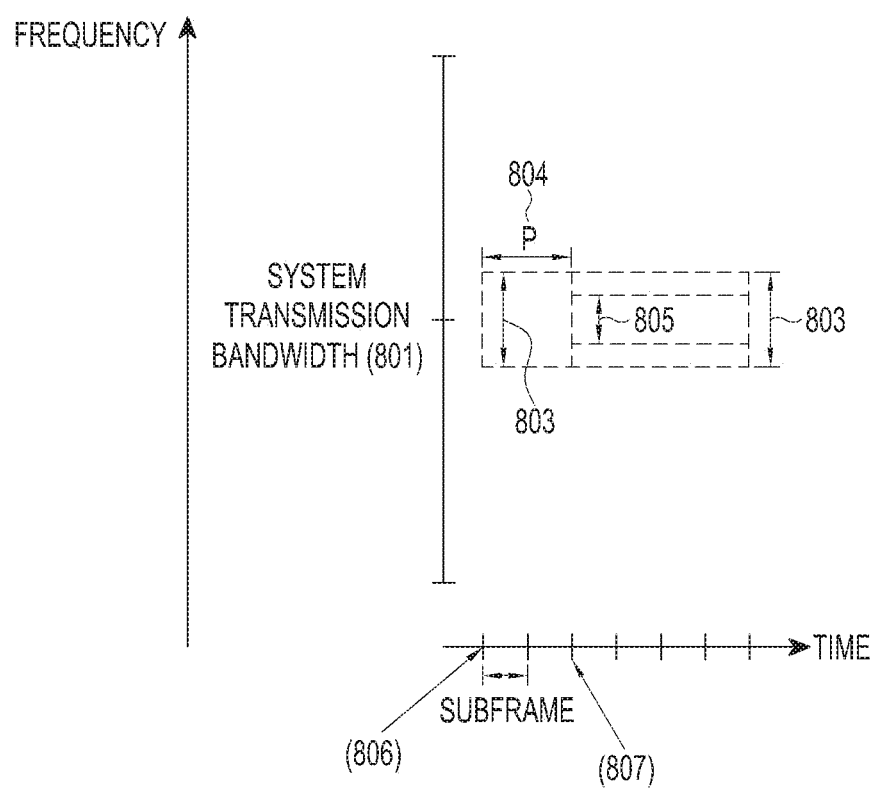
FIG. 8 illustrates a narrow subband monitored by a narrow-band UE according to an embodiment of the present disclosure.

FIG. 8 illustrates a narrow subband that a narrow-band UE monitors according to an embodiment of the present disclosure.

Referring to FIG. 8, the eNB configures a first narrow subband (narrow subband 1) 803 for the narrow-band UE as an RLM subband at time 806. The narrow subband 803 may be a pre-configured part of the system transmission bandwidth 801. If the narrow-band UE is scheduled by the eNB at time 806, the narrow-band UE performs RLM in narrow subband 1 803 during a predetermined time P 804. Subsequently, if the eNB does not schedule a narrow subband for the narrow-band UE until before the time period P 804 elapses, the narrow-band UE performs RLM in a second narrow subband (narrow subband 2) 805 scaled down in size from narrow subband 1 803, starting at time 807. The bandwidth and frequency position of narrow subband 2 805 may be predetermined, and may be set by the eNB or the narrow-band UE. This operation may reduce power consumption in RLM of the narrow-band UE.

If the eNB subsequently schedules a narrow band again for the narrow-band UE, the size of the narrow band for RLM of the narrow-band UE may be returned to that of narrow subband 1 803.

Figure 9:
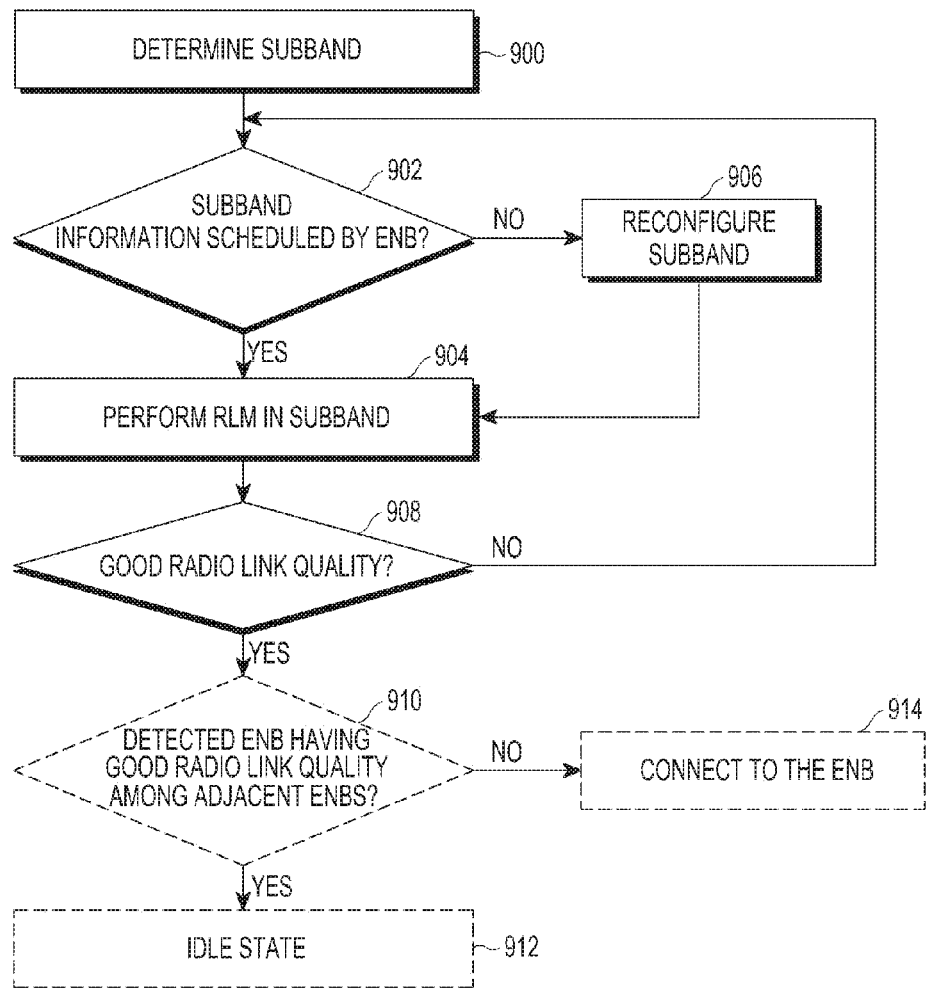
FIG. 9 is a flowchart illustrating an RLM procedure of a narrow-band UE according to an embodiment of the present disclosure.

FIG. 9 is a flowchart illustrating an RLM procedure of a narrow-band UE according to an embodiment of the present disclosure.

Referring to FIG. 9, in operation 900, the narrow-band UE may acquire, from the eNB, narrow subband information from the eNB for radio link quality measurement based on the acquired narrow subband information. The narrow subband information may include information about the positions and number of the subbands. The narrow subband information may be included in an MIB, an SIB for the narrow-band UE, or RRC signaling for the narrow-band UE. However, part of the narrow subband information may be configured directly by the narrow-band UE.

In operation 902, the narrow-band UE determines whether the eNB has scheduled narrow subband information for radio link quality measurement for the narrow-band UE. If the narrow subband information has been scheduled for the narrow-band UE, the narrow-band UE performs RLM in a narrow subband determined based on the narrow subband information in operation 904.

On the contrary, if the narrow subband information has not been scheduled for the narrow-band UE, the narrow-band UE reconfigures a narrow subband for radio link quality measurement selectively according to each embodiment in operation 906. That is, the narrow-band UE does not change a current monitored narrow subband in the second embodiment. In another modification example of the second embodiment, if the narrow-band UE is not scheduled for a narrow subband by the eNB for a predetermined time, the narrow-band UE reconfigures a predetermined narrow subband as a narrow subband for radio link quality measurement. In a further modification example of the second embodiment, if the narrow-band UE is not scheduled for a narrow subband by the eNB for a predetermined time, the narrow-band UE reconfigures a part of a narrow subband being monitored as a narrow subband for radio link quality measurement. If the narrow-band UE reconfigures a narrow subband in operation 906, the narrow-band UE performs operation 904.

In operation 904, the narrow-band UE performs RLM in the narrow subband configured by the eNB or reconfigured by the narrow-band UE. The subsequent operations of the narrow-band UE are optionally performed.

In operation 908, the narrow-band UE determines the radio link quality of the monitored narrow subband. If the radio link quality is good, the narrow-band UE performs operation 902. That is, the narrow-band UE determines whether the eNB has scheduled a narrow subband for radio link quality measurement.

On the contrary, if the radio link quality is not good, the narrow-band UE performs operation 910. Operations 910, 912, and 914 are performed in the same manner as operations 506, 508, and 510 of FIG. 5, respectively and thus will not described herein.

Figure 10:
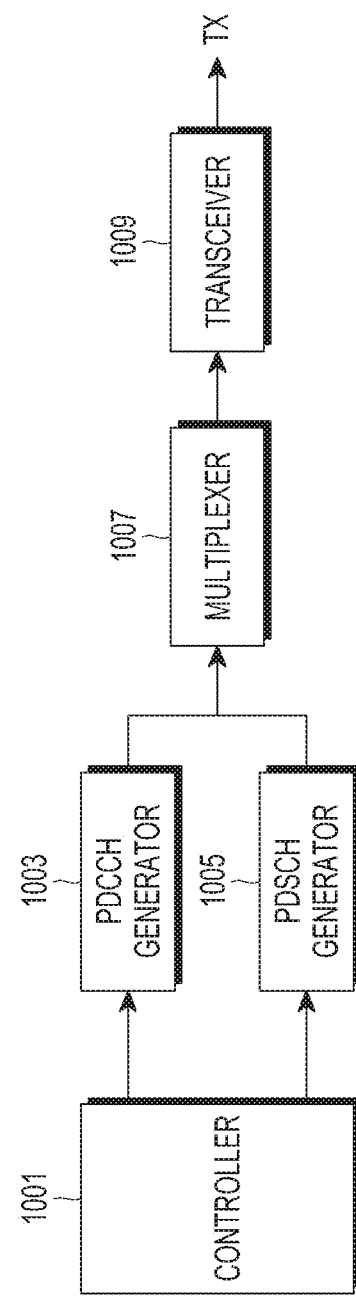
FIG. 10 is a block diagram of a transmission apparatus (for example, an evolved Node B (eNB)) according to an embodiment of the present disclosure.

FIG. 10 is a block diagram of a transmission apparatus (for example, an eNB) according to an embodiment of the present disclosure. For the convenience of description, components which are not related directly to the present disclosure will not be illustrated and described.

Referring to FIG. 10, the eNB may include a PDCCH generator 1003, a physical downlink shared channel (PDSCH) generator 1005, a multiplexer 1007, a transceiver 1009, and a controller 1001. While the following operations are described as performed by separate components, all of the operations may be performed by a single component, when needed. The controller 1001 schedules a narrow-band UE based on control information such as a channel quality indicator (CQI) received from the narrow-band UE. As described before, the controller 1001 performs scheduling within a maximum bandwidth that the narrow-band UE is capable of processing. The controller 1001 provides a result of the scheduling to the PDCCH generator 1003 and controls downlink control information (DCI) configuration and PDCCH generation of the PDCCH generator 1003. The controller 1001 also provides the result of the scheduling to the PDSCH generator 1005 and controls PDSCH generation of the PDSCH generator 1005. The multiplexer 1007 multiplexes the generated PDCCH and PDSCH. The transceiver 1009 processes the multiplexed signal received from the multiplexer 1007 and transmits the processed signal to the narrow-band UE.

Figure 11:
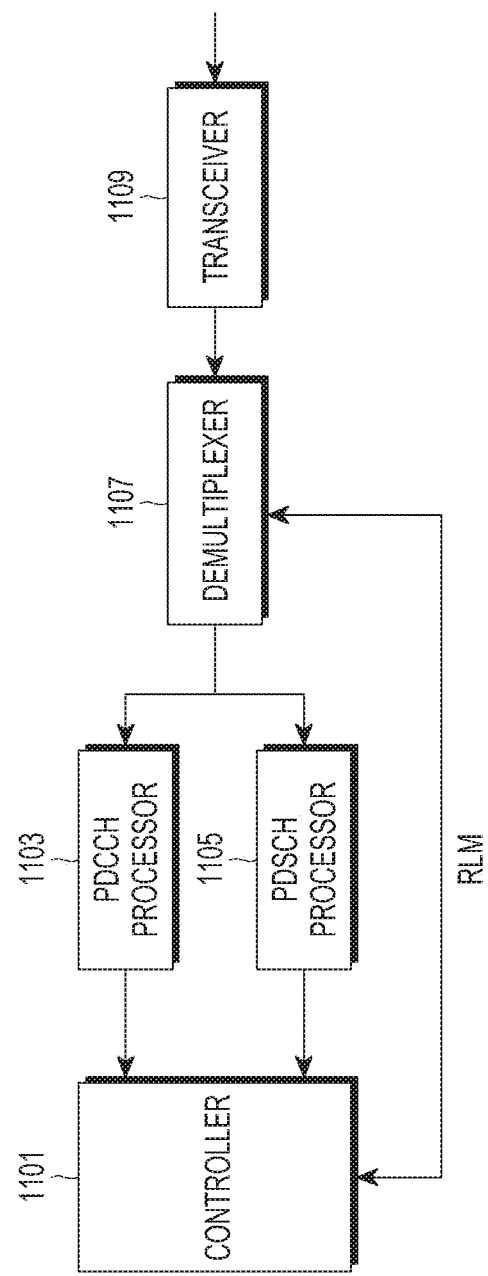
FIG. 11 is a block diagram of a reception apparatus (for example, a UE) according to an embodiment of the present disclosure.

FIG. 11 is a block diagram of a reception apparatus (for example, a narrow-band UE) according to an embodiment of the present disclosure. For the convenience of description, components which are not related directly to the present disclosure will not be illustrated and described.

Referring to FIG. 11, the narrow-band UE may include a PDCCH processor 1103, a PDSCH processor 1105, a demultiplexer 1107, a transceiver 1109, and a controller 1101. While the following operations are described as performed by separate components, all of the operations may be performed by a single component, when needed. The controller 1101 controls each component block of the transceiver 1109 according to one of the foregoing embodiments so that the narrow-band UE may receive an RS from an eNB and determine a radio link quality from the RS. That is, the controller 1101 may determine a narrow subband for RLM based on narrow subband information received on a PDCCH or a PDSCH according to the foregoing embodiments. Alternatively, the narrow subband information may be configured by the reception apparatus. The transceiver 1109 processes a received signal. The demultiplexer 1107 separates a PDCCH signal or a PDSCH signal from the signal received from the transceiver 1109. The PDCCH processor 1103 or the PDSCH processor 1105 acquires information and data about a subband scheduled by the eNB and provides the acquired information and data to the controller 1101.

As is apparent from the foregoing description, the present disclosure can increase the accuracy of determination as to whether an RLF has occurred by providing an RLM method for a UE supporting a bandwidth narrower than a channel bandwidth of a system. The resulting reduction of malfunction can lead to reduction of power consumption and transmission latency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing radio link monitoring (RLM) by a user equipment (UE) in a wireless communication system, the method comprising:
   identifying a first subband for the RLM by the UE, the UE being configured to use the first subband at a predetermined time, wherein the first subband for the RLM corresponds to a preconfigured part of a system transmission bandwidth;
   determining a radio link quality by using a reference signal received in the first subband;
   determining whether a radio link failure has occurred or not by comparing the radio link quality of the first subband with a threshold;
   switching the first subband for the RLM to a second subband for the RLM after elapse of a time period; and
   determining a radio link quality by using a reference signal received in the second subband.

2. The method of claim 1, wherein a bandwidth of the first subband is changed over time in the system transmission bandwidth.

3. The method of claim 1, further comprising:
   receiving, from a base station (BS), information about the first subband,
   wherein the information including at least one of a position of the first subband, bandwidth of the first subband, or a performing time for the RLM at the first subband.

4. The method of claim 3, wherein the information about the first subband is included in a master information block (MIB), a system information block (SIB) for the UE, or radio resource control (RRC) signaling for the UE.

5. The method of claim 1, wherein a bandwidth of the first subband is scaled down in size from the identified first subband, in case that a new subband for the RLM is not scheduled until before a predetermined time elapses.

6. The method of claim 1, further comprising:
   configuring, by the UE, information about the first subband,
   wherein the information including at least one of a position of the first subband, bandwidth of the first subband, or a performing time for the RLM at the first subband.

7. The method of claim 1, further comprising:
   in case that a plurality of subbands are allocated, performing the RLM in the plurality of subbands in a predetermined order.

8. The method of claim 1, wherein the threshold is determined based on a block error rate (BLER).

9. The method of claim 8, wherein the reference signal is not received through outside of the first subband at the predetermined time.

10. The method of claim 1, wherein the threshold is determined based on a block error rate (BLER) estimated from strength of the received reference signal.

11. A user equipment (UE) for performing radio link monitoring (RLM) in a wireless communication system, the UE comprising:
    a transceiver; and
    at least one processor coupled to the transceiver and configured to:
      identify a first subband for the RLM, the UE being configured to use the first subband at a predetermined time, wherein the first subband for the RLM corresponds to a preconfigured part of a system transmission bandwidth,
      determine a radio link quality by using a reference signal received in the first subband,
      determine whether a radio link failure has occurred or not by comparing the radio link quality of the first subband with a threshold,
      switch the first subband for the RLM to a second subband for the RLM after elapse of a time period, and
      determine a radio link quality by using a reference signal received in the second subband.

12. The UE of claim 11, wherein a bandwidth of the first subband is changed over time in the system transmission bandwidth.

13. The UE of claim 11,
    wherein the at least one processor is further configured to control the transceiver to receive, from a base station (BS), information about the first subband, and
    wherein the information including at least one of a position of the first subband, bandwidth of the first subband, or a performing tine for the RLM at the first subband.

14. The UE of claim 13, wherein the information about the first subband is included in a master information block (MIB), a system information block (SIB) for the UE, or radio resource control (RRC) signaling for the UE.

15. The UE of claim 11, wherein a bandwidth of the first subband is scaled down in size from the identified first subband, in case that a new subband for the RLM is not scheduled until before a predetermined time elapses.

16. The UE of claim 11,
    wherein the at least one processor is further configured to configure information about the first subband, and
    wherein the information including at least one of a position of the first subband, bandwidth of the first subband, or a performing time for the RLM at the first subband.

17. The UE of claim 11, wherein the at least one processor is further configured to perform the RLM in a plurality of subbands in a predetermined order, in case that the plurality of subbands are allocated.

18. The UE of claim 11, wherein the threshold is determined based on a block error rate (BLER).

19. The UE of claim 18, wherein the reference signal is not received through outside of the first subband at the predetermined time.

20. The UE of claim 11, wherein the threshold is determined based on a block error rate (BLER) estimated from strength of the received reference signal.

* * * * *